United States Patent [19]

Orikasa

[11] Patent Number: 4,549,583
[45] Date of Patent: Oct. 29, 1985

[54] ARMATURE COIL WINDING APPARATUS FOR FLAT MOTOR

[75] Inventor: Tetsuo Orikasa, Hitachi, Japan
[73] Assignee: Hitachi, Ltd., Tokyo, Japan
[21] Appl. No.: 407,485
[22] Filed: Aug. 12, 1982

[30] Foreign Application Priority Data

Aug. 14, 1981 [JP] Japan .................................. 56-126736

[51] Int. Cl.[4] .............................................. B21F 3/00
[52] U.S. Cl. ..................................... 140/92.1; 29/597; 29/598; 242/7.09; 242/7.05 B
[58] Field of Search ................... 140/92.1, 92.2, 71 R; 29/597, 598, 605; 242/7.09, 7.05 B, 7.14

[56] References Cited

U.S. PATENT DOCUMENTS

3,524,250 8/1970 Burr ....................................... 29/597
3,550,645 12/1970 Keogh ................................. 140/92.2

Primary Examiner—Francis S. Husar
Assistant Examiner—Linda McLaughlin
Attorney, Agent, or Firm—Antonelli, Terry & Wands

[57] ABSTRACT

There is disclosed in this application an armature coil winding apparatus for a flat motor including a coil winding jig having a multiplicity of pins in accordance with the number of coils and a disc-shaped winding jig movable between an open position and a closed position on the surface of the coil winding jig. The disc-shaped winding jig is formed in one portion thereof with a cutout of an angle suiting the coil pitch which receives therein a segmental winding jig with a small gap G. The disc-shaped winding jig and the segmental winding jig are formed with arcuate grooves to allow movement of the pins. There is provided structure for rotating the coil winding jig in indexing movement and for rotating a coil while moving same around an inclined surface formed on the segmental winding jig to thereby automatically wind armature coils.

10 Claims, 8 Drawing Figures

ARMATURE COIL WINDING APPARATUS FOR FLAT MOTOR

BACKGROUND OF THE INVENTION

This invention relates to armature coil winding apparatus for flat motors, and, more particularly, to a coil winding apparatus equipped with improved jigs for winding coils to enable coil winding to be automatically effected.

A winding of armature coils for a flat motor has been performed wholly manually and the operation has been time-consuming. There has, of course, been a desire for effecting automatic armature coil winding, but realization of benefits from automatic coil winding has been hampered by the fact that, in addition to the need to wind the coil in a complex form, a suitable winding machine has been unavailable thereby making it impossible to effect an automatic winding at high speed.

In, for example, U.S. Pat. No. 3,550,645, an automatic armature coil winding apparatus is proposed wherein, coils can be wound automatically by winding a magnet wire in a predetermined number of turns on pins of a winding machine by using a robot or a numerical control device to successively wind a plurality of coils. This apparatus may be used if no particular importance is attached to the time required for carrying out winding, the cost or the finishing touches given to the product. However, this apparatus is incapable of achieving high speed operation and the apparatus is rather high in cost.

SUMMARY OF THE INVENTION

A principal object of the invention is to provide an armature coil winding apparatus for a flat motor capable of effecting automatic armature coil winding by using a simple construction and jigs of novel construction.

Another object is to provide an armature coil winding apparatus for a flat motor of improved operational efficiency in which armature coils produced can have the shape corrected within a coil winding jig while a current is passed thereto so that a set of coils can be produced in completed form in one series of coil winding operations.

According to the invention, an armature coil winding apparatus comprises a coil winding jig having pins for producing a set of coils, a winding jig located on the coil winding jig capable of moving between an open position and a closed position and having a segmental cutout, and a segmental jig adapted to be inserted in the segmental cutout of the winding jig for winding coils on the pins. In this armature coil winding apparatus, when a set of coils that has been wound is heated by passing a current thereto immediately after coil winding, the set of wound coils is pressed at a predetermined pressure level between the winding jig and a segmental press member.

DETAILED DESCRIPTION

Figure 1:
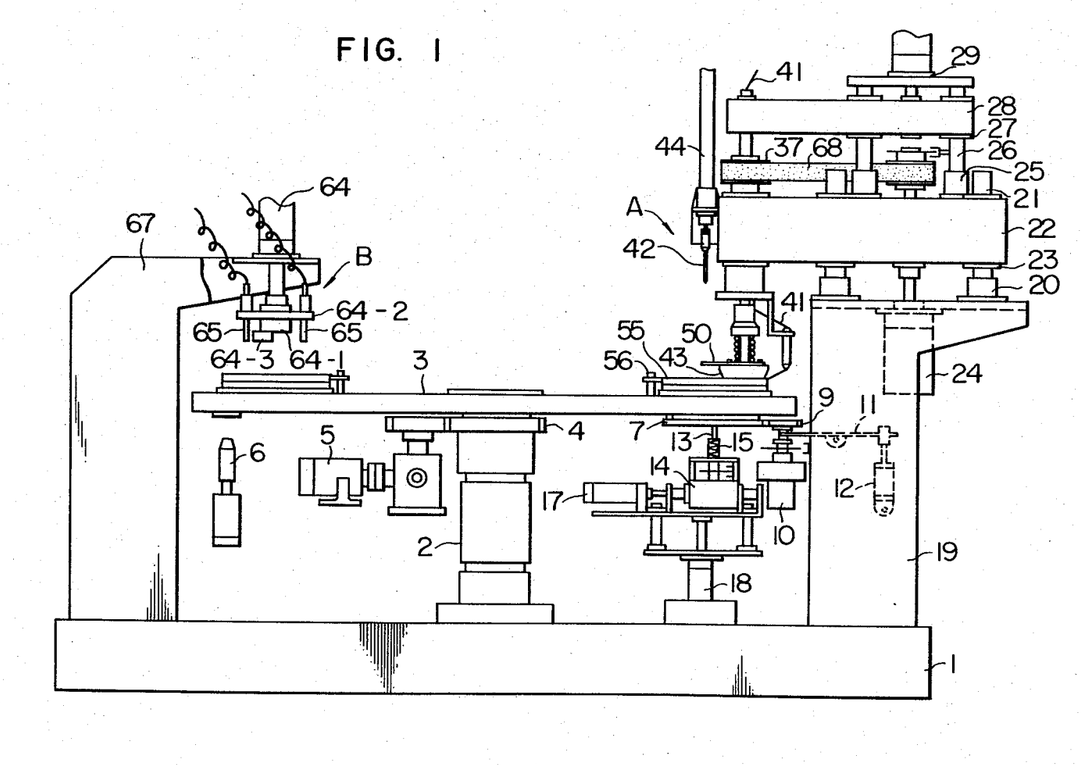
FIG. 1 is a schematic side view of the armature coil winding apparatus for a flat motor comprising one embodiment of the invention.

Referring now to the drawings wherein like reference numerals are used throughout the various views to designate like parts and, more particularly, to FIG. 1, according to this figure, a base 1 for supporting the apparatus includes a post 2 located in upright position in the central portion thereof, with the post 2 rotatably supporting a turntable 3 having a gear 4 integrally formed therewith meshing with an output gear secured to an output shaft of a gear motor 5. A guide pin 6 is actuated by a hydraulic or air cylinder for positioning the turntable 3 in a predetermined location, with the turntable 3 supporting through thrust bearings 61, indexing tables 60 for rotation and with each of the indexing tables 60 having an indexing gear 7 secured to lower portion thereof. A rotary disc 8 is secured to top surface of the indexing table 60 so as to rotate therewith, and a gear meshing with the indexing gear 7 which is driven by a stepping motor 10. The rotary disc is formed in a central portion thereof with an opening 8-1 for a coil tap connection. The gears 9 and 7 are brought into and out of meshing engagement with each other by a lever 11 actuated by an air cylinder 12.

A twist pin 13 is connected through a spring 15 to a twist motor 14 so as to prevent a wire break-out caused by shortening of the overall length of a coil tap 16 as the latter is twisted. The twist motor 14 is equipped with an air cylinder 17 for causing the coil tap 16 to slide leftwardly and rightwardly after it has been twisted to cause the coil tap 16 to be removed from the twist pin 13. The twisting section including these parts is constructed to be moved up and down by an air cylinder 18.

A post 19 supports an upper mechanism for a coil winding unit generally designated by the reference character A having at an upper portion thereof guide holders 20 supporting guide posts 21 which support, through guide bushes 23, a slide base 22 for vertical movement, so that the upper mechanism of the coil winding station A can move up and down as a unit. The up-and-down movement of the coil winding unit A in its entirety is effected by an air cylinder 24. Guide holders 25 are mounted at an upper portion of the slide base 22 for supporting guide posts 26 which, in turn, support a slide base 28 through bushes 27 for vertical movement by means of an air cylinder 29. The slide base 28 is mounted at one end thereof on a ball bearing 30 having, extending therethrough and force-fitted therein from below, a coil winding shaft 31 having a fixed screw 32 secured to its upper end. The coil winding shaft 31 is formed with a vertical bore 31-1 and has a nozzle 32-2 at an upper end thereof while it has in the center a spline shaft portion 31-3 with splines at its outer circumferential surface. The shaft 31 has at a part of its lower end a cutout 31-4 supporting a guide reel 33 for rolling movement and has a ball bearing 34 at an opening at its lower end.

Figure 2:
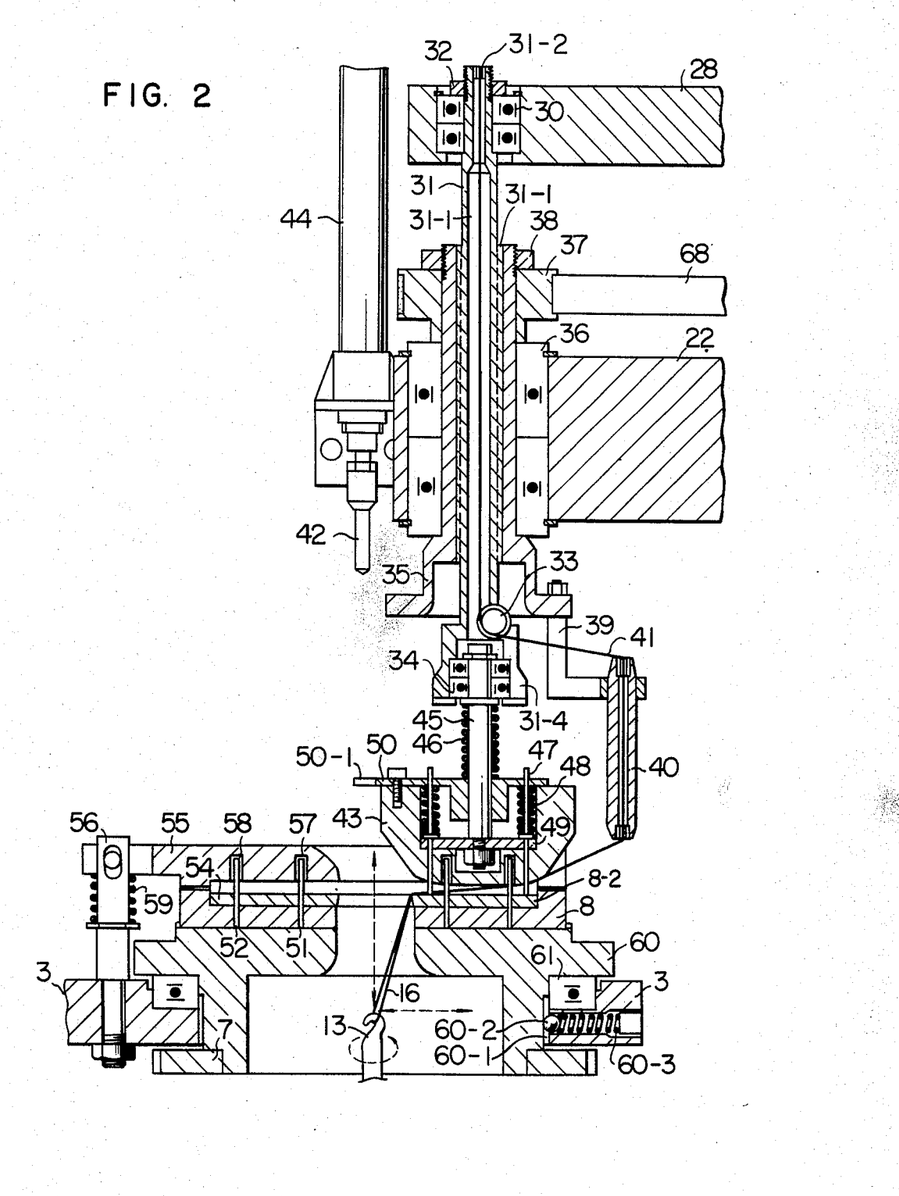
FIG. 2 is a sectional side view of portions of a winding station constructed in accordance with the present invention.

As shown in FIG. 2 a spline sleeve 35 has a ball bearing 36 mounted in the middle of its outer circumferential surface and a pulley 37 secured to its upper end portion by a fixing screw 38. The spline sleeve 35 has at its lower end a rotary nozzle 40 supported by an arm 39 for guiding a magnet wire 41 extending therethrough. The magnet wire 41, for example, an enamel wire sheathed with a coating of thermal melt-adhesion material, such as phenolic, epoxy, or butyral resin. A turn stop pin 42 for a first winding jig 43 is provided to which a pin is attached to the forward end of an air cylinder 44 for engagement with a positioning cutout 55-1 of the first winding jig 43 when the first winding jig 43 moves upwardly and downwardly in sliding movement from its uppermost position to effect turn stop of the first winding jig 43 to avoid relative displacements of the first winding jig 43 and the rotary disc 8.

The first winding jig 43 is supported coaxially with the winding shaft 31 by a shaft 45 journalled by the ball bearing 34 fitted in the lower end opening of the winding shaft 31 and suitably urged by the biasing force of a coil spring 46 wound on the shaft 45 into contact with the coil winding jig 8.

The first winding jig 43 has three spring pins 47 for forming tortoise-shell pattern coils, one spring pin 47 being in a position close to the center of the coil winding jig 8 and the other two spring pins 47 being located remote therefrom. The spring pins 47 can move vertically in sliding movement and are urged by the biasing forces of coil springs 48 to move downwardly.

The coil spring 46 fitted over the shaft 45 for urging the first winding jig 43 has a resilience several times greater than that of the coil springs 48 fitted over the spring pins 47, which resilience is of a value optimally selected with regard to the diameter of the magnet wire 41 by taking into consideration the rigidity of the wire and the tension at which the magnet wire 41 is tensioned.

If the resilience is too great, the gap between the rotary disc 8 and the segmental first winding jig 43 remains as small as when the coil winding is inserted, and the first winding jig is unable to move in an upward direction. Thus, when a unit coil is wound in superposed relationship on a unit coil already wound, it would be difficult to wind the coil in a predetermined shape because the coil unit already wound interfers in the operation. The coil wound at the time the coil winding is terminated would be different in shape from the coil wound at the time the coil winding is initiated, and coils tending to extend toward the outer periphery (horizontally) would be successively wound. As a result, the coils would become greater in outer diameter than the coils of the predetermined shape.

If the resilience is too weak, no coil extension in the direction of the outer periphery would take place but the coils would have their thickness increased in the overlapping winding direction, thereby making it impossible to obtain a predetermined shape in wound coils. Moreover, in extreme cases, there would be the risk that the magnet 41 might move upwardly along an inclined surface (guide portion) 43A of the segmental first winding jig 43.

Figure 5:
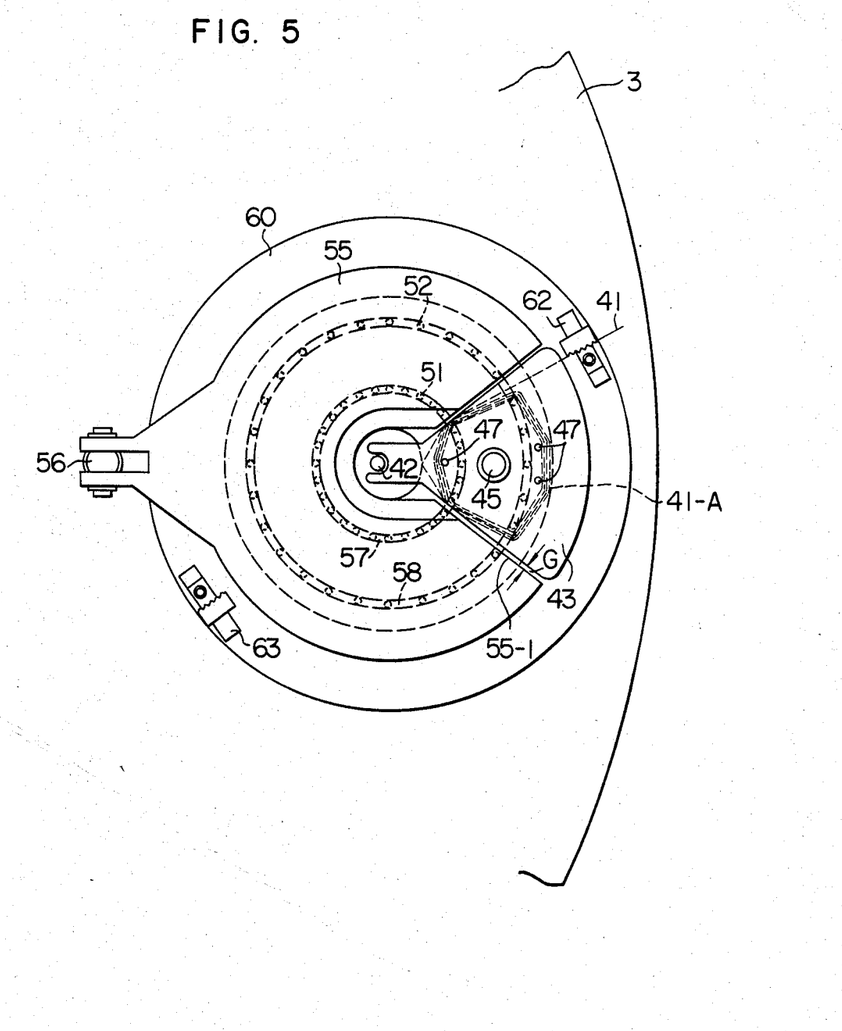
FIG. 5 is a plan view of portions of the winding station.
Figure 6:
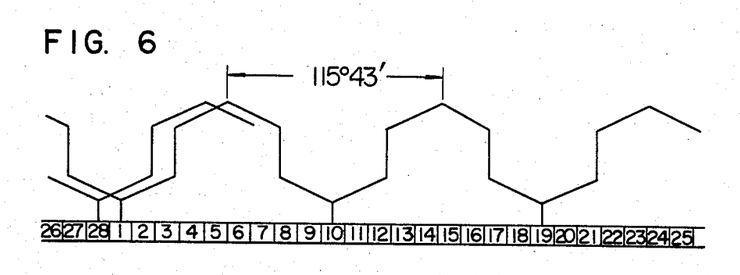
FIG. 6 is a schematic diagram of the manner in which the coil is connected.

A slide plate 49, through which the spring pins 47 penetrate, is screwed to the shaft 45 and a sliding movement of the shaft 45 causes the surface of the slide plate 49 to move flanges of the spring pins 47, upwardly so that the spring pins 47 extending downwardly from the undersurface of the segmental winding jig 43, move into and out of the jig 43. A cover 50 is applied to the surface of the segmental winding jig 43 which slidably supports the spring pins 47 and journals the shaft 45 at its central portion. To this end, the cover 50 is formed of sintered oilless bearing material. As shown in FIG. 5, the rotary disc 8 has a plurality of pins 51 located equidistantly from the center of the rotary disc 8 in positions slightly outwardly of the inner one of the spring pins 47, and a plurality of pins 52 located equidistantly from the center of the rotary disc 8 in positions slightly inwardly of the outer ones of the spring pins 47. In the illustrated embodiment there are twenty-eight pins 51 52 which cooperate with the spring pins 47 to wind coils of the heptagonal shape shown in FIG. 7. The coil is wound not on the adjacent pins 51, 52 but on every fourth pin 51, 52. Arcuate grooves 53 are formed in a lower portion of the segmental first winding jig 43 and have the same radius as the rows of pins 51, 52. The arcuate grooves 53 have a width slightly greater than the diameter of the pins 51 and 52 and a depth which is such that the pins 51 and 52 do not strike the bottom of the grooves 53 when the segmental first winding jig 43 is forced against an ejecting plate 54 which is formed with fifty six apertures each allowing one of the pins 51 and 52 to extend therethrough and arranged in a recess 8-2 on the surface of the rotary disc 8. A disc-shaped second winding jig 55 is mounted at one portion of its outer periphery on a support pole 56 through a support pin 56-1 in a manner so as to be freely opened and closed. Arcuate grooves 57, 58 are formed on the undersurface of the second winding jig 55 and have the same radius as the rows of pins 51 and 52. The width and depth of the arcuate grooves 57 and 58 are the same as those of the arcuate grooves 53. A coil spring 59 urges, by its biasing force, the disc-shaped winding jig 55 to rise to a predetermined elevation and maintains the same in the elevated position. The coil spring 59 is wound on the outer circumferential surface of the support pole 56. A slot 56-2 allows the support pin 56-1 to move vertically a predetermined distance and is formed in the support pole 56. The coil spring 59 biases the second winding jig 55 upwardly beforehand and is operative, when an indexing table 60 is indexed after completion of coil winding, to enable indexing to take place smoothly by maintaining the pins 51 and 52 and the arcuate grooves 53, 57 and 58 in adequate loose interfitting relation without mutual interference. The ejecting plate 54 is coated on its surface with polytetrafluoroethylene or ceramics, so that no damage will be suffered even if coil short-circuiting occurs when a current is passed to effect heating, heat dissipation will be avoided when a current is passed from effecting heating and the set of coils formed will be readily released when ejected after coil winding is completed. The second winding jig 55 is also treated at its undersurface in the same manner as described by referring to the surface of the ejecting plate 54. A segmental cutout 55-1 is formed in one portion of the second winding jig 55 which is slightly smaller than the six pitches of the pins 51, 52, so that when a coil is wound at four pitches the coil will be prevented from being wound on the pins disposed outside of this range. The cutout 55-1 which allows insertion therein of the first winding jig 43, is spaced apart from the jig 43 by a gap G of a size allowing the magnet wire 41 to drop along an inclined surface of the segmental winding jig 43. The first winding jig 43 has a flat portion at its lower end which is angled at a slightly greater degree than the pitches (four pitches in this embodiment) of the pins 51 ad 52 on which a coil is wound.

The indexing table 60 is formed on the side of its outer circumferential surface with a recess 60-1 against which a steel ball 60-2 is maintained in pressing engagement by the biasing force of a coil spring 60-3, to increase the precision with which indexing is effected, with a thrust bearing 61 journaling the indexing table 60.

A coil winding initiating clamp 62 and a coil winding terminating clamp 63 are both located on the indexing table 60 for the unit coil 41A. Upon completion of coil winding, the winding initiating portion and the winding terminating portion are held by the clamps 62, 63. When the coils are held by the clamps 62, 63, serrations of the clamps 62, 63 rupture the sheathings of the magnet wire 41 to reach the core (copper wire), to thereby electrically connect the clamps 62, 63 with the magnet wire 41. Upon a current of a predetermined value being passed to the clamps 62, 63 in this condition, the magnet wire 41 generates heat and the melt-adhesion coating of the magnet wire 41 is melted to allow the portions of the magnet wire 41 forming the unit coil 41A and the magnet wire 41 of the unit coil 41A and a magnet wire 41 of another unit coil 41A to be joined by melt-adhesion. After being cooled for a predetermined period of time, the thermal melt-adhesion coatings set to provide a set of hard coils of a predetermined shape. An electrode 65 passes a current to the clamps 62, 63 and is vertically moved by a cylinder 64 having at its lower end a pressing block 66 comprising a pressing member 66-1 for biasing the second winding jig 55 downwardly when a current is passed to the unit coils 41A to heat same, and a segmental press member 66-2 for directly pressing against a plurality of unit coils 41A stacked in a superposed relationship through the segmental cutout 55-1 of the second winding jig 55. The pressing block 64-1 has secured thereto a support plate for supporting the current passing electrodes 65. A post 67 supports a pressing, current passing and shaping section and a current passing electrode section, and a timing belt 68 transmits rotation to the winding shaft 31 from a timing motor, not shown, and equipped with a position sensor, not shown, for bringing the rotary nozzle 40 to a halt in a predetermined position at all times.

The turntable 3 is arranged with a coil winding station A, a current passing and heating station generally designated by the reference character B and an ejection station. By arranging these three stations in two or three combinations with the three stations being minimum components, it is possible to provide a coil winding apparatus of increased efficiency. More specifically, the coil winding station A may be located above the starting point of the turntable 3, the current passing and coil heating shaping and setting station B may be located at 120 degrees from the starting point of the turntable 3 and the ejecting station may be located at 240 degrees therefrom. In this embodiment, operation of the ejection unit is not necessarily performed without manual attention through the entire process. The ejecting plate 54 is pushed upwardly from the indexing table 60 and the disc-shaped coil winding jig 8 by cylinder pins, not shown, through apertures, not shown, to facilitate releasing of the coils from the pins 47, 51 and 52 on which they are wound.

The above-described embodiment operates in the following manner:

The magnet wire 41, payed out of a bobbin, not shown, is suitably tensioned by tensioning means, not shown, passed through the axial bore in the winding shaft 31, guided by the guide reel 33, and passed through the rotary nozzle 40 until the forward end thereof is held by the clamp 62 as shown in FIG. 5. Then the winding unit A is brought to a position shown in FIG. 2 by actuating the cylinders attached to the various parts, and, in this condition, coil winding can be carried out. That is, when the winding unit A is in this condition, the segmental winding jig 43 is inserted in the cutout 55-1 of the disc-shaped winding jig 55 and kept in contact with the surface of the ejecting plate 54 by the biasing force of the coil spring 46 or located close thereto with slight clearance. At this time, the three spring pins 47 are in pressing contact with the surface of the ejecting plate 54 at their lower ends by the biasing force of the springs 48 at a predetermined pressure level. As described hereinabove, the coil winding jig 8 has the pins 51, 52 attached thereto, so that the tortoise-shell pattern coils 41-1 can be wound on the pins 47, 51 and 52.

Figures 7, 8:
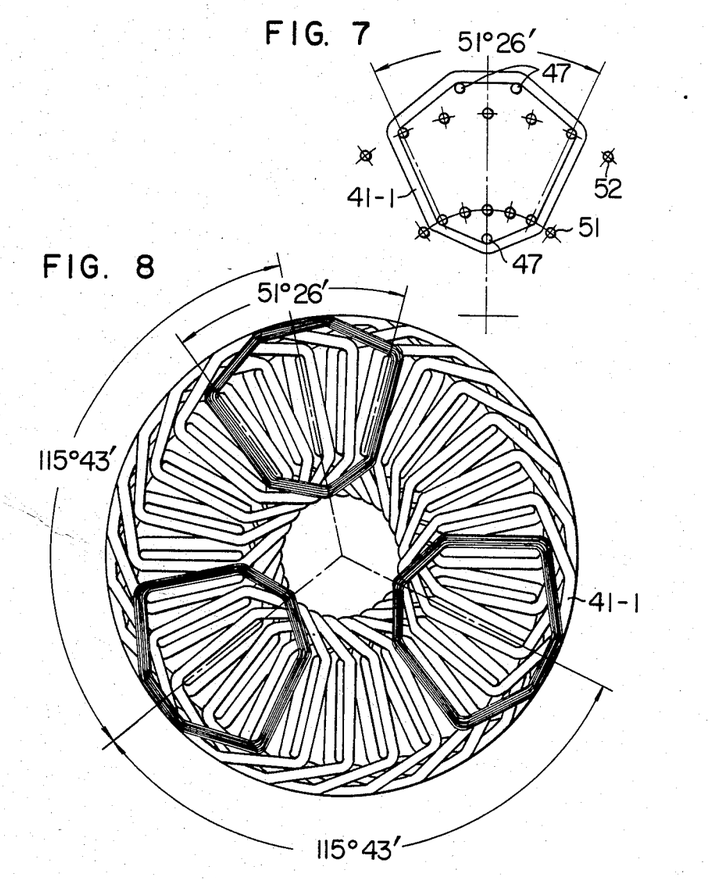
FIG. 7 is a plan view of the pins arranged for producing a coil of the tortoise-shell pattern.
FIG. 8 is a plan view of one example of the flat coil produced by the invention.

Upon a start button, not shown, being depressed, a stepping motor, not shown, for performing coil winding begins to rotate and rotation thereof is transmitted through the timing belt 68 to the pulley 37 and spline sleeve 35, to rotate the rotary nozzle 40. Rotation of the rotary nozzle 40 allows the magnet wire 41 to slide along the inclined surface of the side wall of the segmental winding jig 43 and wound successively on the pins 51 and 52 on the coil winding jig 8. At this time, the winding shaft 31 and the segmental winding jig 43 are in a lower position and the spring pins 47 extend downwardly into contact with the ejecting plate 54, so that the magnet wire 41 is wound on the pind 51, 52 and the spring pins 47 to form a coil of the heptagonal shape as shown in FIG. 7. After the wire 41 is wound with a predetermined number of turns, the rotary nozzle 40 is brought to a halt in a predetermined position. Difficulties would be experienced in forming the unit coil 41A in a predetermined shape in a narrow space (especially in the pitches of the pins 51), and the unit coil 41A tends to expand horizontally or become thick in a vertical direction. This problem is obviated, however, in this embodiment because the first winding jig 43 is pressed by a suitable force by the coil spring and the magnet wire 41 is suitably tensioned, so that the segmental winding jig 43 moves upwardly, though slightly, as the unit coil 41A is wound to enable the unit coil 41A to be wound correctly in the predetermined shape. Additionally, since the angle of the segmental first winding jig 43 and the cutout 55-1 of the second winding jig 55 are in suitable dimensional relation to each other, it is possible to wind the unit coil 41A on the predetermined pins 51 and 52.

After the magnet wire 41 is wound with a predetermined number of turns, the air cylinder 18 is actuated to move the twist pin 13 upwardly and the magnet wire 41 is hooked by a hook of the twist pin 13 as the rotary nozzle 40 makes another revolution.

Figure 3:
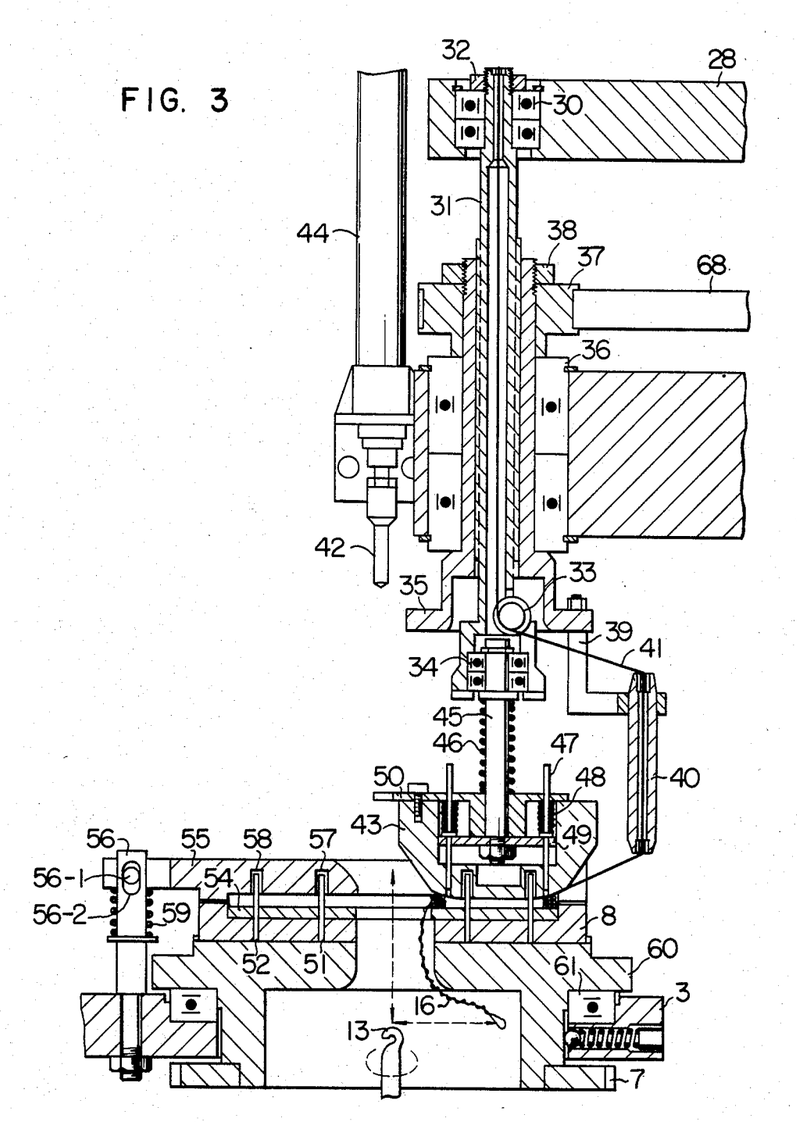
FIG. 3 is a sectional side view of the winding in an indexing condition.

When winding of a set of coils is finished, the air cylinder 29 is actuated to move the winding shaft 31 upwardly to an intermediate position shown in FIG. 3. This causes the slide plate 49 to move upwardly against the biasing force of the coil springs 48 for pulling up the three spring pins 47 extending downwardly from the lower portion of the first winding jig 43, and to withdraw the spring pins 47 into the first winding jig 43. As the winding shaft 31 is moved to the intermediate position, the slide plate 49, secured to the forward end of the shaft 45, also moves upwardly. The first winding jig 43 is urged by the biasing force of the coil spring to move downwardly, but its movement stops when the bottom surface of the cover 50 abuts against the slide plate 49. By adjusting the distance covered by the movement of the winding shaft 31 to its intermediate position, it is possible to set the gap between the bottom surface of the first winding jig 43 and the rotary disc 8 at any level as desired. Also, by setting the distance covered by the upward movement of the first winding jig 43 at a suitable level so long as the forward ends of the pins 51, 52 secured to the rotary disc 8 remains in the recesses 53 formed in the first winding jig 43, it is possible to reduce the force exerted on the unit coil 41A and to avoid dislodging of the already wound unit coils 41A from the pins 51, 52. This allows indexing of the rotary disc 8 to be readily and positively successively performed. Further, rotation of the stepping motor 10 enables indexing to be achieved at a predetermined pitch, in the illustrated embodiment, 115° (43') because connections are wave-shaped with twenty-eight coils and adapted to become a six pole magnet.

At this time, the set of unit coils 41A that has been wound is still pressed by the first winding jig 43 so as to prevent the unit coils 41A from rising to a higher level due to a spring back, so that the unit coils 41A are engaged by the pins 51, 52 and smoothly fed into the gap betwen the bottom surface of the second winding jig 55 and the ejecting plate 54. Also, at this time, a portion of the second winding jig 55, opposite the portion at which the cutout 55-1 is formed, is biased upwardly by a predetermined amount by the coil spring 59 and fixed in position by the poles 56 and the pin 56-1, so that the pins 51, 52 may be maintained in a suitable loose fitting relationship to the arcuate grooves 53, 57 and 58, and the gap between the second winding jig 55 and ejecting plate 54 may be maintained at a suitable level. This is conducive to a smoothly performed indexing operation. Additionally, the second winding jig 55 has a substantial weight which is sufficient to press against a plurality of the unit coils 41A which are indexed and stacked as they are fed to the gap.

Figure 4:
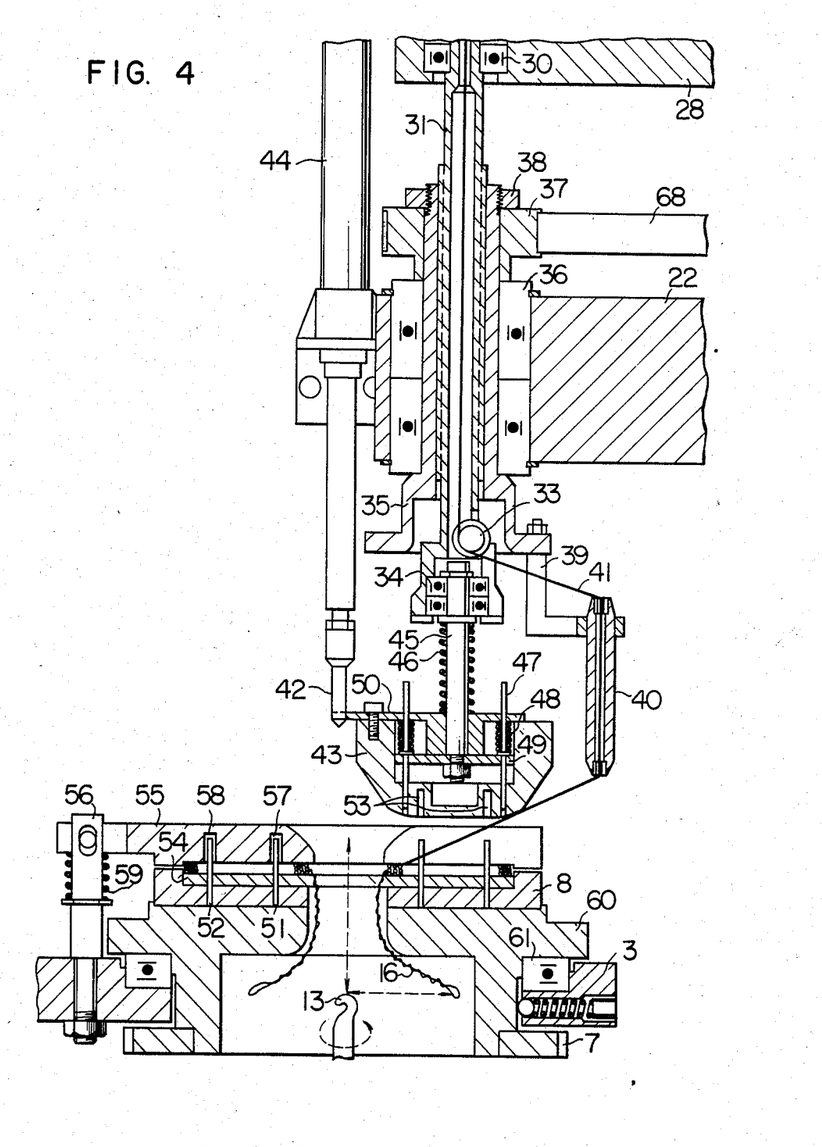
FIG. 4 is a sectional side view of the winding unit in a finished coil condition.

Upon initial indexing being finished, the first winding jig 43 in the intermediate position shown in FIG. 3, moves downwardly to the position shown in FIG. 2 in which it is positioned against the coil winding pins 51 and 52 for the next unit coil 41A. Then, the rotary nozzle 40 is rotated again to wind the next following unit coil 41A. As indexing of the rotary disc 8 is commenced, the twist motor 14 is driven and the coil tap 16 is twisted a predetermined number of times. Upon completion of twisting, the twist pin 13 is brought to a halt in a position in which it faces a predetermined direction, and then the air cylinder 17 is actuated to shift the twist pin 13 leftwardly and rightwardly to remove the coil tap 16 from the hook. This operation is repeatedly performed to wind a predetermined number of unit coils 41A such as, for example, twenty-eight units. When the predetermined number of unit coils 41A have been wound, the first winding jig 43 moves upwardly, and the turntable 3 moves. However, if the first winding jig 43 moves upwardly immediate after completion of coil winding, the coil group wound in a final winding operation would tend to move upwardly. To avoid this problem, the air cylinder 29 is actuated upon completion of coil winding and the coil winding shaft 31 is moved upwardly to an intermediate position to move the spring pins 47 of the first winding jig 43 into the interior of the jig 43. Thereafter, a predetermined indexing operation is performed. This, the unit coil 41A wound in the final coil winding operation is embraced by the second winding jig 55, thereby preventing the coil group from moving upwardly. However, at this time, the unit coil 41A wound in an intermediate coil winding operation appears in the cutout 55-1 of the second winding jig 55. This particular unit coil 41A is held down by the coil wound thereon in superposed relation, so that it does not move upwardly and indexing can be smoothly performed. The end portion of the wire used for winding the unit coil 41A in the final coil winding operation is clamped by the clamp 63 and cut off by a cutter (not shown). Then the air cylinder 25 is actuated and all of the mechanisms of the coil winding station A located in an upper portion move upwardly as shown in FIG. 4. At this time, the first winding jig 43 is free as it is brought out of engagement with the second winding jig 55, so that the air cylinder 44 is actuated earlier than the air cylinder 24 to bring the turn stop 42 into engagement with a cutout formed in the cover 50 to thereby prevent the first winding jig 43 from rotating. Then, the cylinder 12 is actuated to bring the gears 7 and 9 out of meshing engagement with each other, to bring the turntable 3 to a condition in which it is above to perform indexing. The turntable 3 is rotated for indexing through 120°, for example, and a set of unit coils 41A, for example, twenty-eight in number and disposed in superposed relationship is fed into the current passing and coil heating, shaping and setting station B where the air cylinder 64 is actuated to cause the pressing block 66 to press and shape the set of unit coils 41A, while the current passing electrode 56 is connected to the clamps 62 and 63 to pass a current thereto. The pressing block 64-1 is capable of performing pressing and shaping of the set of coils almost perfectly because it comprises the press member 64-2 for pressing against the second winding jig 55, and the segmental pressing body 64-3 for directly pressing against the set of coils through the cutout 55-1 of the second winding jig 55. Meanwhile, a series of coil winding operations is repeatedly performed during this time at the coil winding station A. The current being passed is interrupted after lapse of a predetermined period of time. Thereafter, the set of coils is allowed to stand in the pressed and shaped condition for a predetermined period of time (25-30 seconds), before the air cylinder 64 is restored to its upper position. Upon completion of a series of coil winding steps at the coil winding station A, the turntable 3 is further rotated for indexing through 120°. At the ejecting station, the second winding jig 55 can be pivotally moved to an open position through the support pin 56-1 to allow the ejection plate 54 to be moved upwardly by means of an air cylinder, (not shown) as the set of flat coils can be removed from the apparatus. Removal of the coils after being shaped may be selectively performed either manually or automatically. In any case, the provision of the ejecting plate 54 facilitates removing of the completed coils from the apparatus.

The aforesaid construction of the embodiment of the armature coil winding apparatus in conformity with the invention can be modified as follows:

(a) The members and positions of the pins 51, 52 and the spring pins 47 can be varied depending on the shape of coils to be wound or any of the pins may be done without depending on the shape of the coils;

(b) Various cylinders may be either hydraulic or air cylinders and may be replaced by electric motors;

(c) The ejecting plate 54 may be eliminated; however, in this case, the rotary disc 8 should have its surface provided with a coating;

(d) The coil spring 46 for biasing the first winding jig 43 has advantageously its resilience adjustable depending on the degree of tension of the magnet wire 41 and the speed of rotation of the rotary nozzle 40. Thus, the diameter of the magnet wire 41 handled is not specified;

(e) The turntable 3 may be replaced by conveyor means moving along a straight line in reciprocating movement;

(f) The rotary disc 8 and the indexing table 60 may be formed integrally as a unitary structure; and (g) The apparatus may be used as a horizontal type as a whole.

From the foregoing description, it will be appreciated that the invention enables high speed automatic operation of armature coil winding for a flat motor to be realized for the first time by using a simple construction.

While a preferred embodiment of the invention has been shown and described hereinabove, it is to be understood that the invention is not limited to the specific form of the invention shown and described and that many changes and modifications may be made therein without departing from the scope of the invention described in the following claims.

What is claimed is:

1. An armature coil winding apparatus for a flat motor, the armature coil winding apparatus comprising:
   a frame means;
   a rotary disc mounted on said frame means;
   groups of pins provided on said rotary disc, said groups of pins being located at predetermined pitches and arranged on at least two concentric circles;
   means connected to the rotary disc for rotating the rotary disc in an indexing operation;
   a first winding jig disposed on said rotary disc having a guide section for winding a magnet wire on a plurality of specific pins selected from the groups of pins, said selected plurality of pins being arranged within a set of coils to be wound during a winding operation;
   means for forming recesses in the first winding jig for receiving the selected plurality of pins;
   a second winding jig located adjacent the first winding jig with a predetermined gap existing therebetween;
   means disposed adjacent said first winding jig for guiding and feeding the magnet wire while rotating around the first winding jig; and
   wherein the magnet wire is fed through the gap and wound on the selected plurality of pins.

2. An armature coil winding apparatus for a flat motor as claimed in claim 1, wherein each group of said groups of pins includes an equal number of pins, and wherein the pins of each group are in radial alignment with the pins of another group.

3. An armature coil winding apparatus as claimed in claim 1, wherein said means for forming the recesses in said first winding jig includes concentric arcuate grooves each opening in a direction of rotation of the rotary disc.

4. An armature coil winding apparatus for a flat motor as claimed in claim 1, wherein said second winding jig is a circular structure having a cutout for receiving said first winding jig and formed with arcuate grooves for receiving pins in said group of pins other than said selected plurality of pins, said second winding jig mounted for movement toward and away from said rotary disc between an open position and a closed position.

5. An armature coil winding apparatus for a flat motor as claimed in claim 1, further comprising a shaft means for supporting said first winding jig for movement into and out of contact with said rotary disc, pin means provided on said first winding jig, and means for biasing the first winding jig toward said rotary disc.

6. An armature coil winding apparatus for a flat motor as claimed in claim 5, further comprising coil spring means for biasing said pin means provided on said first winding jig toward said rotary disc with a predetermined force.

7. An armature coil winding apparatus for a flat motor as claimed in claim 6, wherein said coil spring means biasing said first winding jig has a resilience higher than a resilience of the coil spring means for biasing said pins.

8. An armature coil winding apparatus for a flat motor as claimed in claim 5, wherein said means for biasing includes coil spring means biasing the first winding jig toward the rotary disc with a predetermined force.

9. An armature coil winding apparatus for a flat motor as claimed in claim 5 further comprising a slide plate means provided on said first winding jig for allowing said pins to move into and out of said first winding jig.

10. An armature coil winding apparatus as claimed in claim 5, further comprising means disposed above said first winding jig and cooperable therewith for moving said first winding jig downwardly to bring said pins into abutting engagement with said rotary disc, said pins comprising spring pins, and means disposed on said frame means for indexing an indexing table when the spring pins are disposed in the first winding jig, and wherein said first winding jig is removed from a cutout formed in said second winding jig after a series of coil winding operations is completed to allow the turntable to rotate.

* * * * *